(No Model.)
D. A. STREETER.
PIPE PLUG.
No. 474,196. Patented May 3, 1892.
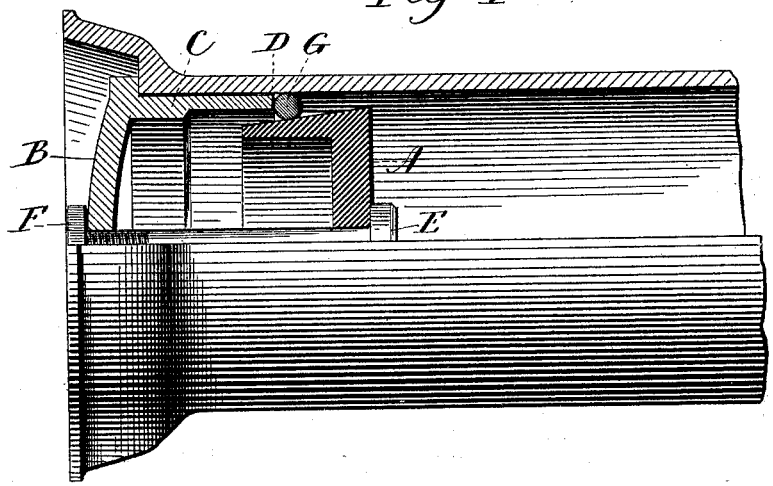
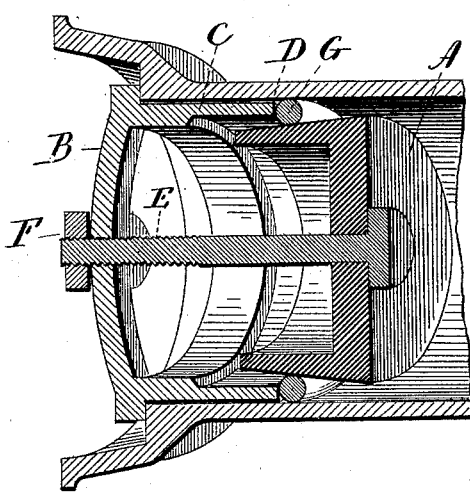
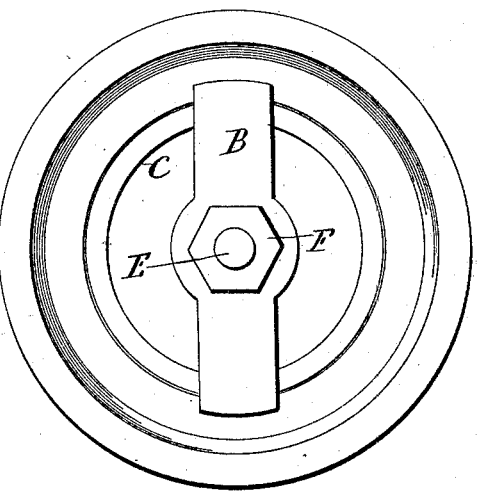

UNITED STATES PATENT OFFICE.

DANIEL A. STREETER, OF WATERBURY, CONNECTICUT.

PIPE-PLUG.

SPECIFICATION forming part of Letters Patent No. 474,196, dated May 3, 1892.

Application filed December 14, 1891. Serial No. 415,047. (No model.)

*To all whom it may concern:*

Be it known that I, DANIEL A. STREETER, of Waterbury, in the county of New Haven and State of Connecticut, have invented a new Improvement in Pipe-Plug; and I do hereby declare the following, when taken in connection with accompanying drawings and the letters of reference marked thereon, to be a full, clear, and exact description of the same, and which said drawings constitute part of this specification, and represent, in—

Figure 1, a side view, one-half in longitudinal central section; Fig. 2, a perspective longitudinal section of the end portion of a length of pipe with the plug inserted, and Fig. 3 an outer end view of the pipe as plugged.

This invention relates to a device for closing the end of a length of water-main or pipes which are adapted to be laid in the ground and which are usually constructed with a flange or neck at one end to receive the corresponding end of the next length of pipe.

The object of the invention is to securely pack the plug by the interposition of a soft ductile metal between the plug and the inside of the pipe.

The invention consists in the construction as hereinafter described, and particularly recited in the claim.

A represents the plug, which is of conical shape, its larger diameter less than the internal diameter of the pipe to be plugged, and which is adapted to be set into the end of the pipe, the larger end of the plug inward, as seen in Fig. 2.

B represents a bar adapted to be arranged diametrically across the end of the pipe and so as to take a bearing on the end of the pipe. This bar is constructed with a tubular flange C, of a diameter somewhat less than the internal diameter of the pipe. The internal diameter of the flange is somewhat larger than the smaller diameter of the plug, and so that when the bar B rests against the end of the pipe the flange will extend into the pipe, and so that its edge will form an annular shoulder within the pipe and around the conical plug.

E represents a bolt, which extends from the plug outward through the bar B, and to the outer end of the bolt a nut F is applied, by means of which the plug may be drawn outward or toward the bar.

Within the pipe, around the surface of the plug A, a soft ductile metal ring G is placed, the external diameter of this ring corresponding substantially to the internal diameter of the pipe and so that the ring may rest against the surface of the shoulder D, formed within the pipe by the flange C. The plug is drawn into the ring by means of the nut or other suitable device, the shoulder D of the flange C affording a resistance to prevent the ring moving with the plug, and such drawing of the conical plug into the soft metal ring compresses the soft metal between the periphery of the plug and the inner surface of the pipe, and so as to form a firm and secure packing between the plug and pipe. The plug having been applied, the pressure within the pipe will only tend to force the plug more firmly into the packing. At any time when it is desirable to remove the plug it is only necessary to withdraw the nut F to loosen the plug, so that it may be removed, together with the ring G.

I do not claim, broadly, an elastic ring, a conical plug with a nut, and a screw whereby the said conical plug is drawn into the elastic ring to produce an expansion thereof, nor do I claim such a conical plug and elastic ring when used in combination with a resistance-ring, which coacts with the plug, both operating as wedges to expand the elastic ring, as such I am aware is not new; but I am not aware that a conical plug has been combined with a surrounding flange provided with means for locating said flange within a pipe so that the said flange will form an annular shoulder within the pipe, and with a soft metal packing-ring adapted to rest against the shoulder so formed within the tube and into which ring the conical plug may be drawn while the ring is located by the said flange, and so as to expand the ring, essential features of my invention, as hereinafter recited.

I claim—

The herein-described plug for pipes, consisting of the conical plug A, of a diameter less than the internal diameter of the pipe and adapted to be inserted into the pipe the larger end inward, combined with a flange C, of an external diameter somewhat less than the internal diameter of the pipe to be plugged, the flange provided with a cross-bar B, adapted to rest upon the end of the pipe, while the flange extends into the pipe, the edge of the said flange forming an annular shoulder D within the pipe and around the plug, a ductile metal ring G between the said plug and adapted to rest against the said edge of the flange, with mechanism substantially such as described between the said cross-bar and plug adapted to draw the said plug into the said ring and toward the said bar, substantially as and for the purpose described.

In testimony whereof I have signed this specification in the presence of two subscribing witnesses.

DANIEL A. STREETER.

Witnesses:
GEO. L. WELTON,
WM. W. BONNETT.